United States Patent
Matsuhashi

(10) Patent No.: US 7,567,044 B2
(45) Date of Patent: Jul. 28, 2009

(54) BRAKING DEVICE FOR AN ELECTRICALLY DRIVEN ROTOR

(75) Inventor: Shuichi Matsuhashi, Gunma (JP)

(73) Assignee: Japan Servo Co., Ltd., Tokyo (JP)

( * ) Notice: Subject to any disclaimer, the term of this patent is extended or adjusted under 35 U.S.C. 154(b) by 320 days.

(21) Appl. No.: 11/726,153

(22) Filed: Mar. 21, 2007

(65) Prior Publication Data

US 2007/0222290 A1 Sep. 27, 2007

(30) Foreign Application Priority Data

Mar. 24, 2006 (JP) .............................. 2006-082230

(51) Int. Cl.
*H02P 3/00* (2006.01)

(52) U.S. Cl. ................... 318/375; 318/373; 318/759; 318/763; 188/159; 310/93

(58) Field of Classification Search ............... 318/375, 318/373, 759, 763; 180/65; 188/159; 310/93
See application file for complete search history.

(56) References Cited

U.S. PATENT DOCUMENTS

| | | | | |
|---|---|---|---|---|
| 4,051,418 A | * | 9/1977 | O'Berto et al. | 318/759 |
| 4,311,948 A | * | 1/1982 | Brown et al. | 318/759 |
| 4,450,397 A | * | 5/1984 | Painter et al. | 318/762 |
| 4,482,853 A | * | 11/1984 | Bhavsar | 318/778 |
| 4,514,677 A | * | 4/1985 | Kaufman et al. | 318/759 |
| 4,712,054 A | * | 12/1987 | Boldt | 318/758 |
| 4,833,386 A | * | 5/1989 | Unsworth | 318/763 |
| 5,170,105 A | * | 12/1992 | Kumar | 318/362 |
| 5,424,622 A | * | 6/1995 | Keller et al. | 318/375 |
| 5,644,202 A | * | 7/1997 | Toriyama et al. | 318/369 |
| 6,043,996 A | * | 3/2000 | Kumar | 363/41 |
| 6,956,751 B2 | * | 10/2005 | Youm et al. | 363/37 |
| 7,109,686 B2 | * | 9/2006 | Schulte et al. | 320/167 |

* cited by examiner

*Primary Examiner*—Rita Leykin
(74) *Attorney, Agent, or Firm*—Patterson, Thuente, Skaar & Christensen, P.A.

(57) ABSTRACT

A braking device for an electrically driven rotor comprises a drive signal generating circuit for an electrically driven rotor, an output stage, a motor for the electrically driven rotor, driven by the output stage, and a monitor circuit for detecting interruption of an electric power supply for the motor. The output stage has a MOSFET of an upper stage side and a MOSFET of a lower side, and a diode inserted between a gate of the MOSFET of the lower stage side and the electric power supply. An electromagnetic brake is generated and applied on the electrically driven rotor when the MOSFET of the upper stage side is turned OFF and the MOSFET of the lower stage side is turned ON by a control signal from the monitor circuit, and an exciter coil of the motor is shorted when the electric power supply is interrupted.

3 Claims, 6 Drawing Sheets

BRAKING DEVICE FOR AN ELECTRICALLY DRIVEN ROTOR

RELATED APPLICATION

The present application claims priority to Japanese Application No. 82230/2006 filed Mar. 24, 2006, which is incorporated herein in its entirety by reference.

FIELD OF THE INVENTION

The present invention relates to a braking device for an electrically driven rotor, and more particularly, relates to a braking device for an electric fan to be operated when an electric power supply thereof is interrupted.

BACKGROUND OF THE INVENTION

In recent years, an axial flow fan of high power output and revolution has been required in the market. With such a fan, when the electric power supply of the fan is interrupted for the maintenance or the inspection of the device, including the fan itself, a long period of time passes before the propeller of the fan stops.

Accordingly, if a finger, or other foreign object, is inserted into the still rotating fan by mistake, injury or damage may result.

In order to avoid the above defect, a finger guard or shield may be mounted. However, this increases noise, cost and effort. Accordingly a fan having no such defects has been required.

FIG. 6 shows a drive circuit for a conventional electric fan, wherein a reference numeral 1 denotes a regulator circuit portion, 2 denotes a drive signal generating circuit portion, 3 and 4 denote NPN transistors, 5 to 12 denote resistors, 13 and 14 denote NPN digital transistors, 15 and 16 denote MOSFETs of an upper stage side, 17 and 18 denote MOSFETs of a lower stage side, 19 denotes an exciter coil of an electric motor for driving a rotor, 20 denotes a capacitor, reference letter A denotes a voltage of an electric power supply, B and C denote upper stage side drive signals, and D and E denote lower stage side drive signals.

The drive circuit shown in FIG. 6 is operated normally by switching MOSFETs 15 and 16 of the upper stage side and MOSFETs 17 and 18 of the lower stage side by drive signals B, C, D and E applied from drive signal generating circuit portion 2. Voltage A of the electric power supply is lowered rapidly as shown in FIG. 7 when the electric power supply is interrupted, so that MOSFET 15 of upper stage side is turned OFF because the gate voltage thereof is lost, and MOSFET 17 of lower stage side is turned OFF because the gate voltage D' thereof is discharged through resistors 10 and 9. A long time passes before the rotation of the fan is stopped because the rotation of the fan is reduced only by the cogging torque, mechanical friction of the bearing, and the flow resistance of the fan propeller. Accordingly, during inspection and maintenance of the fan, even if the electric power supply of the fan is interrupted, the propeller may still be rotating, so that if a finger, or other foreign object, is inserted into the rotating fan by mistake injury or damage may result.

A drive circuit for an electric fan as shown in FIG. 8 is publicly known. The drive circuit of FIG. 8 utilizes a mechanical relay 22 having a B contact which is inserted between the terminals of the electric power supply so as to short the exciter coil of the motor 19 by the B contact.

In the braking device as shown in FIG. 8, the B contact of the relay 22 is opened when the voltage of the electric power supply is applied, and MOSFETs 15 and 16 of the upper stage side and MOSFETs 17 and 18 of the lower stage side are turned OFF when the electric power supply is interrupted. The B contact is closed when no voltage is applied on the input side of the mechanical relay 22, so that the exciter coil of motor 19 is shorted, such that an electromagnetic brake is generated and the propeller of the fan is stopped forcibly. In the above conventional braking devices, however, a relay of large contact capacity must be used, a large inside space for installing therein a large mechanical relay is required in the fan, and the reliability of the mechanical relay is low.

SUMMARY OF THE INVENTION

An object of the present invention is to obviate the above defects.

The above object can be accomplished by a braking device for an electrically driven rotor comprising a drive signal generating circuit for an electrically driven rotor, an output stage having a MOSFET of an upper stage side and a MOSFET of a lower stage side, a motor for the electrically driven rotor driven by the output stage, a monitor circuit for detecting interruption of an electric power supply for the motor, and a diode inserted between a gate of the MOSFET of the lower stage side and the electric power supply, wherein an electromagnetic brake is generated and applied to the electrically driven rotor when the MOSFET of the upper stage side is turned OFF and the MOSFET of the lower stage side is turned ON by a control signal from the monitor circuit, and an exciter coil of the motor is shorted when the electric power supply is interrupted.

The motor is driven by a single-phase full bridge circuit, or a three-phase full bridge circuit.

According to the braking device for the electrically driven rotor of the present invention, the time required for stopping the propeller can be reduced remarkably by adding a small number of electronic parts and applying an electromagnetic brake forcibly when the electric power supply is interrupted.

These and other aspects and objects of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

DETAILED DESCRIPTION OF THE PREFERRED EMBODIMENTS

Figure 1:
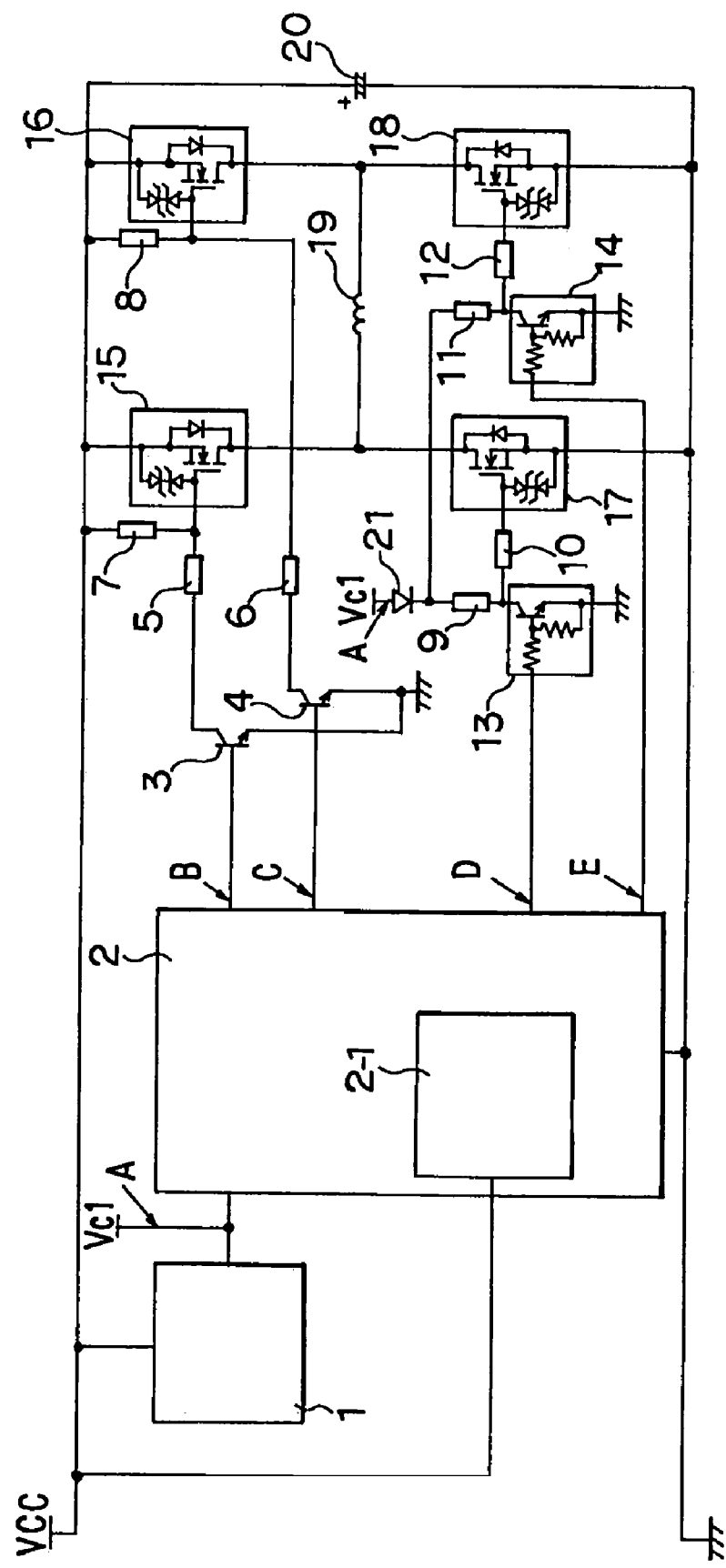
FIG. 1 is a circuit diagram of a braking device for an electrically driven rotor according to the present invention.

A braking device of an electrically driven rotor according to the present invention comprises, as shown in FIG. 1, a regulator circuit portion 1, a drive signal generating circuit 2 for an electric fan, an output stage having MOSFETS 15 and 16 of an upper stage side and MOSFETS 17 and 18 of a lower stage side, an exciting coil of an electric motor 19 driven by the output stage, NPN digital transistors 13 and 14 inserted between drive signal generating circuit 2 and gates of MOS-FETs 17 and 18 of the lower stage side, a monitor circuit portion 2-1 for detecting the interruption of the electric power supply, and a diode 21 for preventing a discharge from the gates of MOSFETs 17 and 18 of the lower stage side, inserted between a voltage A terminal and the gates of MOSFETs 17 and 18 of the lower stage side.

Figure 2:
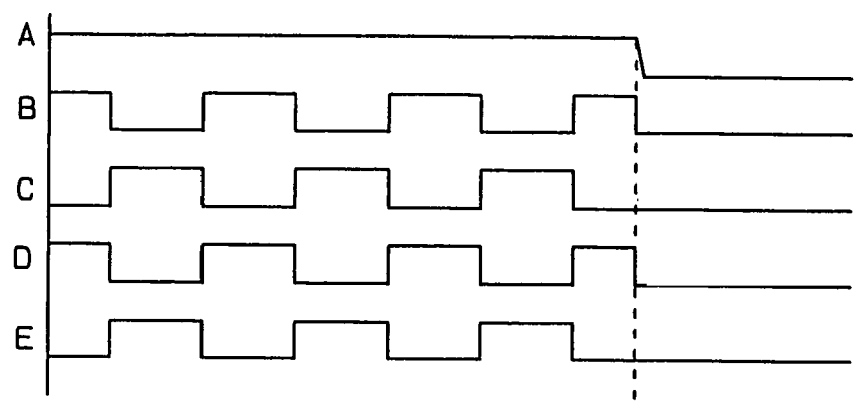
FIG. 2 is a diagram for explaining the circuit shown in FIG. 1.

In the braking device for the electrically driven rotor according to the present invention mentioned above, when the electric power supply is interrupted as shown in FIG. 2, the interruption is detected by monitor circuit portion 2-1 and drive signal generating circuit 2 generates a drive signal for turning OFF MOSFETs 15 and 16 of the upper stage side of the output stage. Further, MOSFETs 17 and 18 of the lower stage side of the output stage are turned ON, because drive signals D and E of the drive signal generating circuit 2 are lowered.

Figure 3:
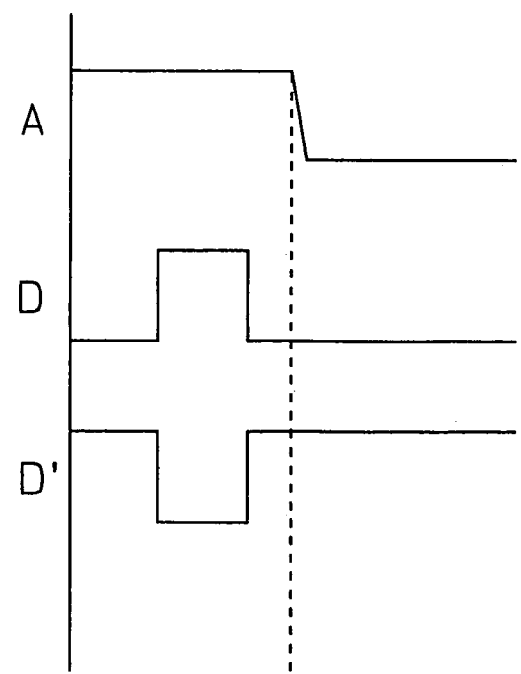
FIG. 3 is another diagram for explaining the circuit shown in FIG. 1.

That is, voltage A of the control power source is lowered when the electric power supply is interrupted, as shown in FIG. 3. However, each of the MOSFETs 17 and 18 of the lower stage side has a parasitic capacity and diode 21 is inserted between the voltage A terminal and the gates of MOSFETs 17 and 18 of the lower stage side, so that a gate voltage D' of each of MOSFETs 17 and 18 are not discharged even if the voltage A of the electric power supply is lowered. Accordingly, the gate voltage D' is maintained as it is until the gate voltage D' is discharged naturally, so that MOSFETs 17 and 18 of the lower stage side are maintained in an ON state. The exciter coil of the motor 19 is shorted because MOSFETs 17 and 18 of the lower stage side are turned ON due to the parasitic capacities included in the MOSFETs 17 and 18 of the lower stage side, generating an electromagnetic brake and stopping the fan forcibly. According to this principle, the present invention can be applied to either single-phase or three-phase full bridge driving.

Figure 4:
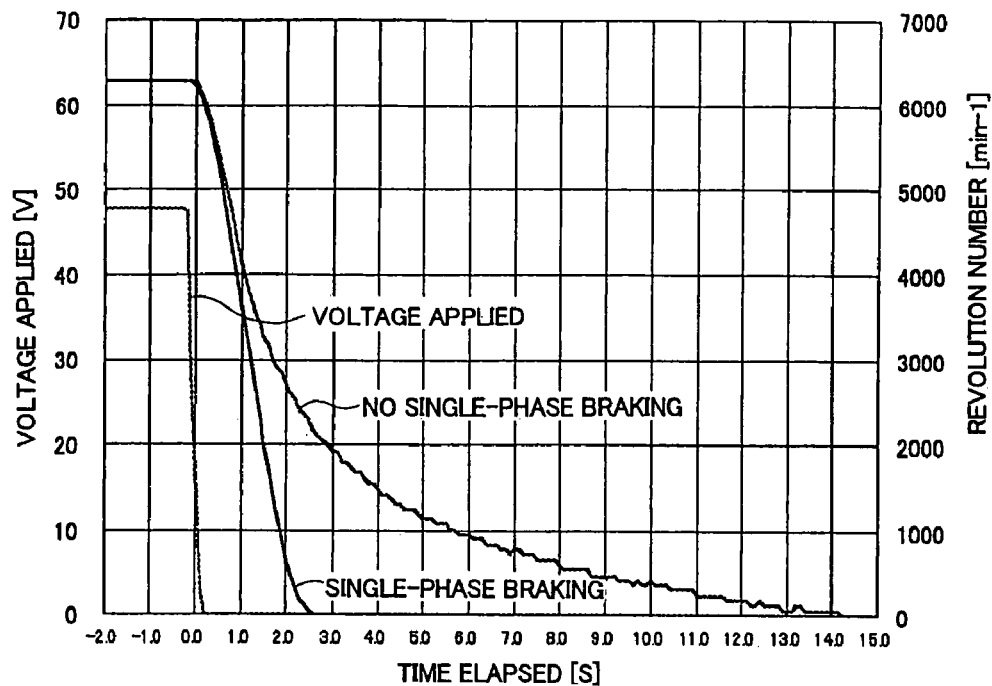
FIG. 4 is a graph explaining an effect of a braking device for the electrically driven rotor driven by a single-phase power supply according to the present invention.
Figure 5:
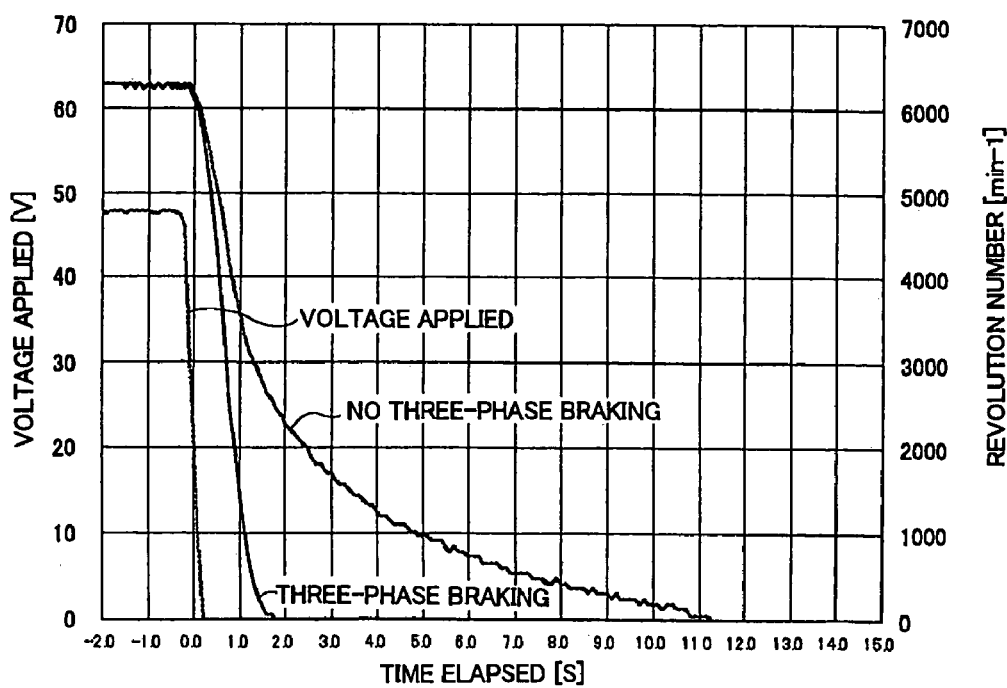
FIG. 5 is a graph explaining an effect of a braking device for an electrically driven rotor driven by a three-phase power supply according to the present invention.
Figure 6:
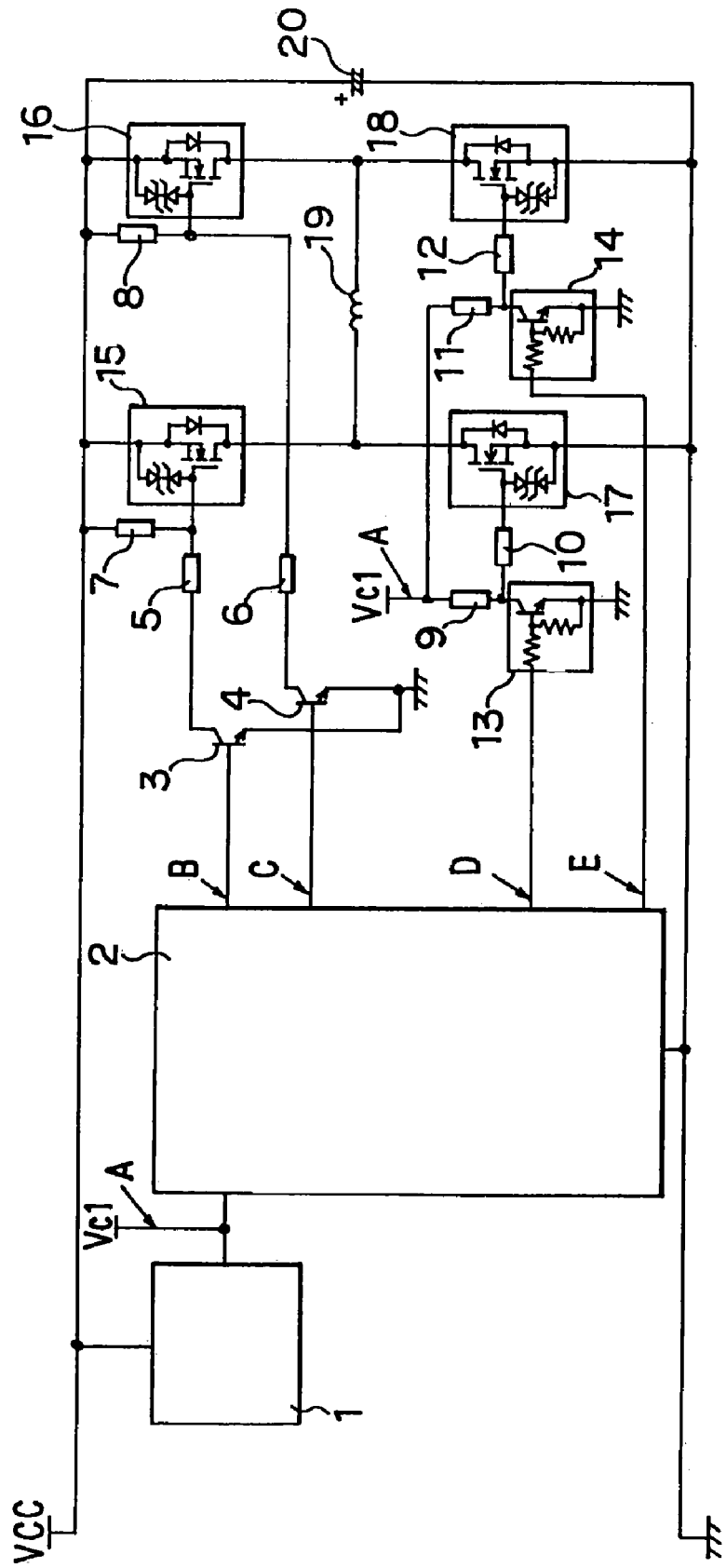
FIG. 6 is a circuit diagram of a driving circuit of a conventional electrically driven rotor.
Figure 7:
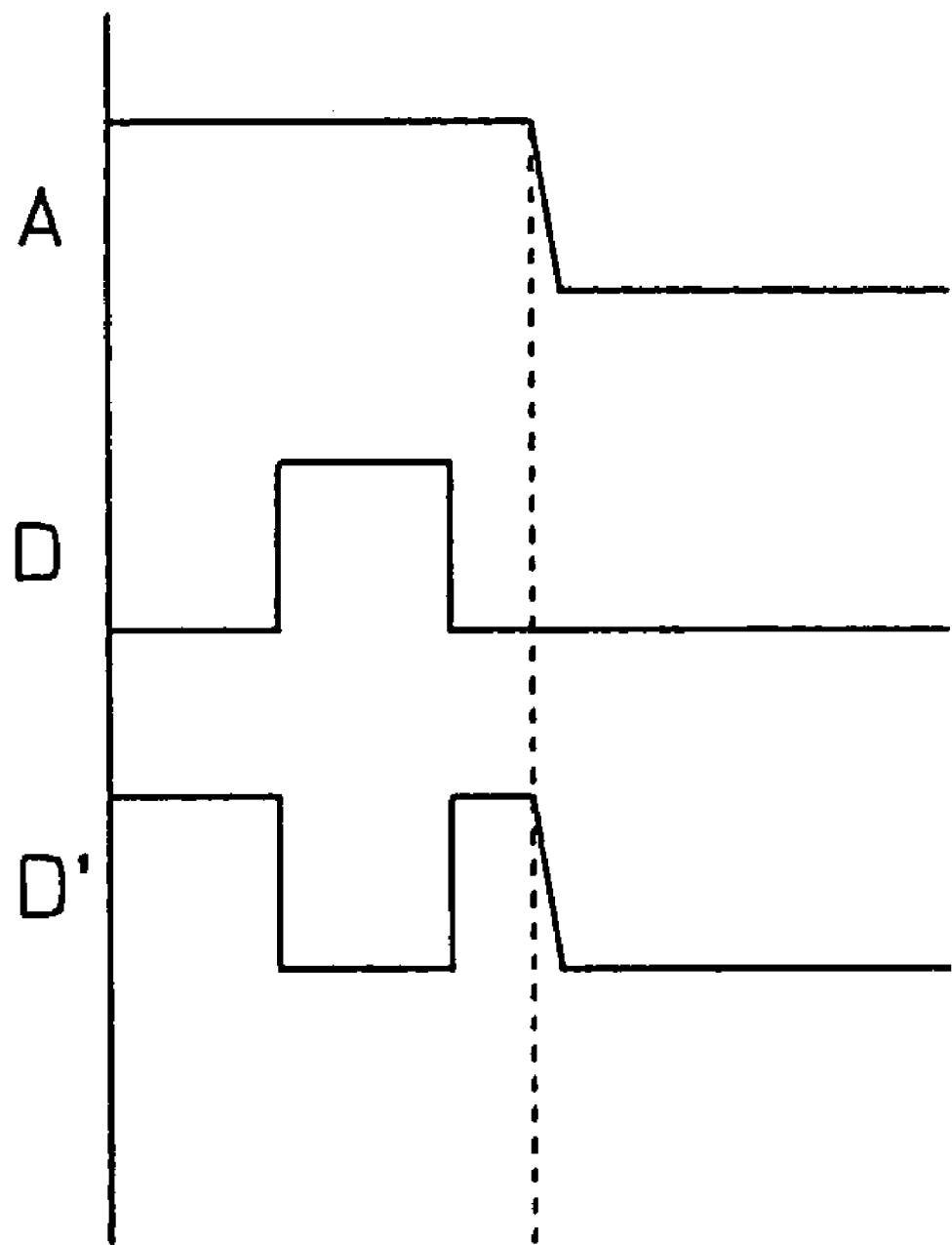
FIG. 7 is a diagram for explaining the circuit shown in FIG. 6.
Figure 8:
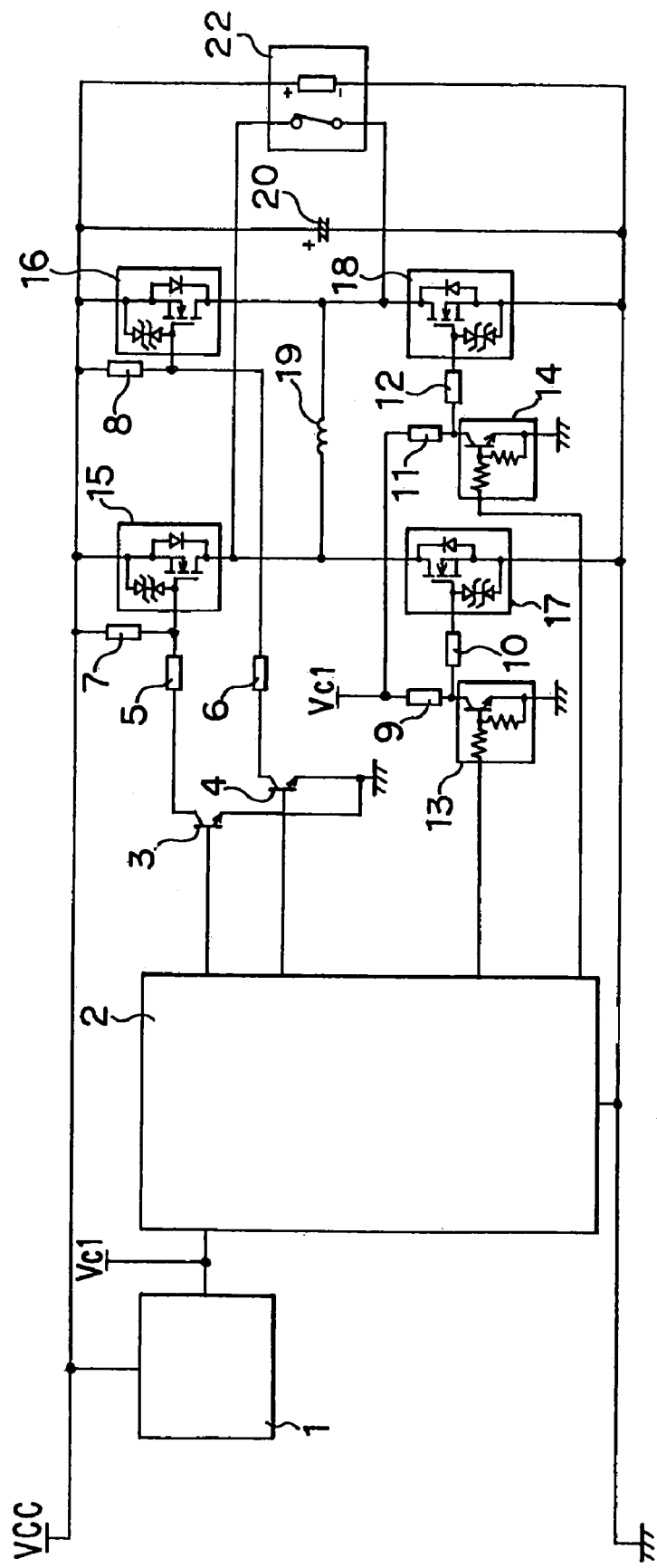
FIG. 8 is a circuit diagram of a braking device of another conventional electrically driven rotor.

The actual effects of single-phase and three-phase driving are shown in FIG. 4 and FIG. 5, respectively.

The test example is an axial flow fan of 120 mm in diameter and 6300 rpm. In order to stop the single-phase or three-phase fan having no electromagnetic brake, about 11 to 15 seconds are required after the electric power supply is interrupted. It is recognized, however, that the fan can be stopped within 2 to 3 seconds by the braking device for the electrically driven rotor according to the present invention after the electric power supply is interrupted.

According to the present invention, the time required to stop the fan can be reduced remarkably.

While the invention has been particularly shown and described with reference to the preferred embodiments thereof, it will be understood by those skilled in the art that various changes in form and details may be made therein without departing from the spirit and scope of the invention as defined by the appended claims.

What is claimed is:

1. A braking device for an electrically driven rotor comprising:
   a drive signal generating circuit for an electrically driven rotor;
   an output stage having a MOSFET of an upper stage side and a MOSFET of a lower stage side;
   a motor for the electrically driven rotor, driven by the output stage;
   an exciter coil of the motor;
   a monitor circuit for detecting interruption of an electric power supply for the motor; and
   a diode inserted between a gate of the MOSFET of the lower stage side and the electric power supply; and
   wherein an electromagnetic brake is generated and applied to the electrically driven rotor when the MOSFET of the upper stage side is turned OFF and the MOSFET of the lower stage side is turned ON by a control signal from the monitor circuit, and the exciter coil of the motor is shorted when the electric power supply is interrupted.

2. The braking device as claimed in claim 1, wherein the motor is driven by a single-phase full bridge circuit.

3. The braking device as claimed in claim 1, wherein the motor is driven by a three-phase full bridge circuit.

* * * * *